United States Patent [19]
Wyss

[11] Patent Number: 4,668,878
[45] Date of Patent: May 26, 1987

[54] ELECTRIC POWER SWITCH CONTAINING SELFPROGRAMMED CONTROL TIMER WITH CONTINUOUSLY REFRESHED CYCLE OF ON/OFF SEQUENCES

[76] Inventor: Hugo Wyss, Essorbiers 32, CH - 20022 Bevaix, Switzerland

[21] Appl. No.: 734,948

[22] PCT Filed: Aug. 19, 1984

[86] PCT No.: PCT/EP84/00288
§ 371 Date: May 14, 1985
§ 102(e) Date: May 14, 1985

[87] PCT Pub. No.: WO85/01364
PCT Pub. Date: Mar. 28, 1985

[30] Foreign Application Priority Data
Sep. 22, 1983 [CH] Switzerland .......................... 5141/83

[51] Int. Cl.$^4$ .............................................. H01H 43/04
[52] U.S. Cl. ..................................... 307/141; 307/139; 364/141; 364/143
[58] Field of Search .......... 200/38 D, 38 DA, 38 DB, 200/38 DC; 364/140, 141, 142, 143, 144, 145; 307/141; 323/906; 361/182; 307/139, 140, 141.4

[56] References Cited
U.S. PATENT DOCUMENTS
4,293,915 10/1981 Carpenter et al. ............... 364/145 X FOREIGN PATENT DOCUMENTS
0001700 5/1979 European Pat. Off. ........... 364/141

Primary Examiner—William M. Shoop, Jr.
Assistant Examiner—Bentsu Ro
Attorney, Agent, or Firm—Pollock, Vande Sande & Priddy

[57] ABSTRACT

Electric power switch housed in a housing B, operated manually by a toggle or button I and connected to ends V and W of an electric power cord supplying power to an electrical appliance or apparatus. In the housing B there is a built-in cyclical electronic control timer which when the commutator S is in the "stand-by" position continously stores during a gliding period of time (cycle) the schedule of sequences of on/off power switchings, as commanded by the user by operation of I, into an electronic memory. When the commutator S is in the "simulation" position, operation of the electric power switch is taken over by the electronic control timer, which implements power switchings cyclically and indefinitely according to the schedule of sequences of on/off power switchings stored in said memory during the cycle immediately preceding the transition from the "stand-by" to the "simulation" mode of operation and as long as the commutator S stays in the "simulation" position.

2 Claims, 5 Drawing Figures

ELECTRIC POWER SWITCH CONTAINING SELFPROGRAMMED CONTROL TIMER WITH CONTINUOUSLY REFRESHED CYCLE OF ON/OFF SEQUENCES

TECHNICAL FIELD

The subject matter of the invention is a microprocessor controlled timer, which is continously programmed in real time by actuation of a manual power switch (stand-by mode) and which on request can replace the function of the manual power switch (simulation mode).

RELATED APPLICATION

This application is a continuation of the Swiss Application No. 5 141/83-3, filed Sept. 22, 1983 and entitled "Relais électrique à séquence temporelle cyclique autoprogrammable".

BACKGROUND AND SUMMARY OF INVENTION

The present invention relates to power switches with built-in programmable timers of the type which has its most important commercial application as a control for energizing and de-energizing of electrical appliances used in homes and offices, which emit acoustic or luminous energy, thus simulating the presence of persons, when these are in fact absent. A deterrent effect is thus achieved on intruders, although certain aspects of the invention have a more general application. In such a commercial application, the present invention will form an electric power switch, of the type to be connected in series with a power cord of the appliance and incorporated in the housing of the appliance itself or in its miniaturized version just connected as a mobile switch at the two ends of the power cord carrying the power from the plug to the appliance.

The utilization of mechanical and electromechanical timers for similar purposes is known since long time. These devices have small dimensions and are easily programmed by users without any technical knowledge. Their main drawback lies in the limited amount of on/off sequences which can be programmed during a cycle, which usually covers a time period of a day or a multiple thereof. So it is difficult to have more than 100 on/off sequences per cycle, and the minimum delay between two adjacent sequences is also limited by the precision, with which mechanical markers can be machined and visually seen as distinct. A further drawback of these type of timers lies in their limited lifelength, due to wear of mobile mechanical parts.

Consequently in the last ten years novel fully electronic means of enacting the timer function have been devised, allowing for a very large number of on/off sequences per cycle and remotely controlling a large number of appliances with different of/off sequences for each appliance. In their known form, these devices consist of a central control console, with a built in microprocessor timer and a input keyboard, and of a certain number of peripheral remotely controlled switches, which control energization of the appliances. Unfortunately these devices are not easily programmed by unskilled persons and even the skilled ones need often a well written manual, their installation costs are quite high and they take up a sizable volume.

The object of the present invention is to realize an electric power switch with built-in electronic timer, whose use is straightforward when the user wants it to act as a simulator during his absence, whose dimensions are compatible with the space available in appliances, and having an extremly high number of on/off sequences during any given cycle. Furthermore the lifelength of the electric power switch according to the invention is not limited by wear of mechanical rotating or moving parts and the installation on existing appliances or other electrical apparatus can be handled by any person familiar with electrical power connection practice. A further object of this invention is to provide an electric power switch, which can even compensate for inadvertent oblivion by the user, when leaving without requesting the electric power switch to enter into the simulation mode, which is appropriate during his absence.

To achieve these aims, the electric power switch according to the invention is housed in a container B (FIG. 1), having suitable input and output connections for the power cord and being activated by the user thru manual pression on a suitable knob, toggle or button I, which is well visible for the user. A further smaller commutator S, placed on the side or the underside of the container, having at least a stable position for the "stand-by" mode of operation and another stable position for the "simulation" mode of operation, is operated by the user, when he is either leaving or coming back from a prolonged absence from the room, where the electrical apparatus is installed, which is energized by the electric power switch according to this invention. Thus the operation of this switch is so simple, that even illiterate users can learn and retain its operating procedure. In a refined version of the electric power switch according to the invention, the commutator S has a third intermediate stable position "fail safe stand-by", whereby if the user does not activate the main manual toggle I within a certain period of time since the last manual operation of I, the electric power switch automatically and without any action from the outside goes over to the "simulation" mode and stays in that mode until the manual toggle I is operated again.

In accordance with another feature of the present invention, any dysfunction of the electric power switch which is detected by a special self-check program stored in a suitable memory of the microprocessor gives rise to a coded alarm signal in the form of a characteristic train of very frequent on/off sequences of the power energizing the appliance, thus alerting the user that something is wrong.

Since the use of electronic memories in the timer portion of the electric power switch allows the storing of a very large number of on/off sequences during one cycle, the preferred cycle duration is of one week or a multiple thereof. This has the advantage that the changing pattern of on/off sequences during workdays and weekends is simulated properly when the electric power switch is in the "simulation" mode. In accordance with another feature of the present invention, the microprocessor checks at regular intervals the content of each day section of the stored program of on/off sequences and in case it finds a one day section which is empty (e.g. has not a predetermined minimum amount of on/off sequences), it replaces said one day section with another which is available in the stored program, having a large number of on/off sequences.

This last feature of the invention is particularly useful when installing the electric power switch for the first time, since then, if no particular provisions have been taken, the stored program controlling the timer portion of the electric power switch is completely empty, e.g. all the one day portions of it are empty. After a one day period of use of the electric power switch in the "stand-by" mode, all the empty one-day sections of the stored program will then automatically be filled with the pattern of on/off sequences of the first day, allowing the user to set the electric power switch into the "simulation" mode even though said switch was not in use in the "stand-by" mode for the full length of a recording cycle. Accordingly no special initialization of the timer has to be performed upon the first time of use, which again is very useful and acceptable for technically unskilled users, the only requirement being to use the electric power switch in the "stand-by" mode at least for one day.

Since power failures of short duration (less than 5 minutes) are quite frequent, the critical parts of the timer portion of the electric power switch are protected against loss of power by voltage supplied by a small rechargeable battery or a litium battery, which is provided in the low voltage supply part of the electric power switch. In particular the electronic memory holding the stored program of on/off sequences and the clock are fed by the emergency battery in case of power failure. If the voltage of the emergency battery falls below a certain proper value, the microprocessor, according to another feature of the present invention, detects it and signals it to the user by generating a train of frequent on/off sequences of the power energizing the appliance. This allows the user of either changing the emergency battery or waiting until the battery has been recharged, before setting the electric power switch into the "simulation" mode.

According to another feature of the present invention, in case that the electric power switch has been disconnected from the power outlet for a very long period of time, the appliance it controls not being used or having been inadvertently disconnected by children or other unaware people, the electric power needed to keep the clock and the memory with the stored on/off sequences going is supplied under the day by a photovoltaic cell which charges the emergency battery with the current generated by conversion of daylight, so as to compensate also for the loss of charge of the battery during the night period. A preferred version of such a photovoltaic cell is an amorphous silicon solar cell, which is mounted on the same side of the container B where also the main toggle I is located, so as to get maximum light exposure during the day.

When in the same building more than one electric power switch according to the present invention are installed, it might be useful to control from a central point the setting of said switches into the "simulation" mode or back into the "stand-by" mode. To achieve this and according to another feature of the present invention, the microprocessor is provided with a special decoder circuit, which decodes high frequency signals which are sent along the power lines from a suitable central unit which is operated by the user when leaving or coming back from a prolonged absence. So when a coded high frequency signal is sent along the power lines, each electric power switch goes simultaneously into the "simulation" mode, but each of said switch has a different program of on/off sequences, which simulate e.g. the activity of a person moving from one room to the other. Furthermore and according to another feature of the present invention, the electric power switches are provided with a coded high frequency signal emitting circuit, which sends alarms signal into the power line, in case that the manual toggle I is activated when the electric power switches are operating in the "simulation" mode. Since by definition during the "simulation" mode nobody should be in the building, if there is a charge of the status of any of the toggles I an intruder has penetrated into the building: in this case the coded high frequency signals emitted by the corresponding electric power switch are received and decoded by the central unit, which can then take proper action, e.g. alerting the police over the phone line or energizing an acoustic alarm horn.

In the case where high security is required, the electric power switch is provided according to another feature of the present invention with a voice recognition electronic device, which is speaker dependent and connected to a small microphone, mounted on a suitable face of the container B, so as to be exposed optimally to the mouth of the user, who is entitled to operate it. At the time of first installation of the said switch, the authorized user can teach the voice recognition device by spelling e.g. the works "stand-by" and "simulation" when the commutator S is in the corresponding position and having a special auxiliary button for the "teach" function depressed with his hand. After that, the access to the commutator S is rendered difficult to unauthorized persons, by sealing it e.g. with a lid or any other physical means hampering access and the electric power switch is incorporated into the electrical apparatus which it controls, having only the side with the toggle I and the microphone exposed to the outside. With this particular set-up only the authorized user is able to commute the electric power switch from the "stand-by" into the "simulation" mode and vice versa.

Furthermore it might be useful for the user to have a feed-back, that the electric power switch is properly operating in the "simulation" mode, when the order to do it is either entered by action on the commutator S or by other previously described means. According to another feature of the invention, such an immediate feed-back signal is generated by having after a short delay upon the change of mode a predetermined sequence of few on/off or off/on switches of the power, which end after 10 to 30 seconds, signalling to the user that the microprocessor is working properly. In opposition to this and as already said before, if there is some dysfunction of the electric power switch, the sequences of on/off power switches keep steadily going for as long as the user is taking appropriate action to eliminate said dysfunction.

A further check that the electric power switch according to the present invention is in the "simulation" mode can be achieved by disabling the toggle I in the "simulation" mode, that is either disconnecting from the power the input of the manual switch operated by the toggle I or by suppressing any action that the toggle operated switch might have on the operation of the microprocessor. This feature of the present invention is especially useful in buildings, where security guards performs regular tours, checking the status of electrical apparatus: when operating the toggle I they notice no change in the energized status of the apparatus, they have the proof that the electrical power switch is in the "simulation" mode.

When the appliance or apparatus which is controlled by the electric power switch needs a variable power input according to the user's wishes, it might be useful, according to another feature of the present invention, to incorporate the power regulating means into the electric power switch in such a way, that the microprocessor is storing the on/off sequences and the level of power allowed during the "on" state into said memory during the "stand-by" mode and replays then during the "simulation" mode both the on/off sequences and the level of electric power allowed, as they were stored during the immediately preceding cycle in the "stand-by" mode. The same considerations apply to appliances or apparatus which need for their operation DC voltage supply, in which case the AC/DC converter may be incorporated into the electric power switch, having the added benefit that DC power can be directly supplied to the electronic control timer, if provisions are made in order to have an output of the AC/DC converter with the suitable DC voltage (in most cases 5 V).

The above and other advantages and features of the invention will become apparent upon making reference to the specification to follow, the claims and the drawings.

DESCRIPTION OF DRAWINGS

FIG. 3 is a box diagram of the basic control elements of the electronic control timer and of the power switching means according to another embodiment of the present invention, where the toggle or button as well as the stand-by/simulation commutator are housed in an auxiliary housing, as apparent from FIG. 1b, and where said power switching means are of the solid-state type, like ignition controlled rectifiers and the like.

DESCRIPTION OF FIRST EXEMPLARY FORM OF THE INVENTION

Figure 1:
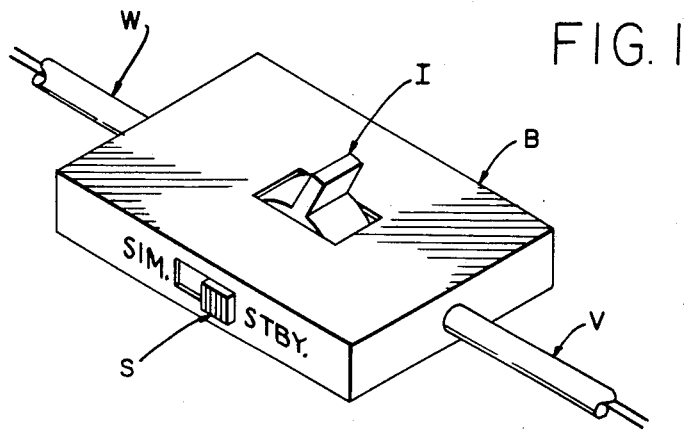
FIG. 1 is a perspective view of an electric power switch, connected between the ends of the electric power carrying cord, which supplies power to the appliance or apparatus which is turned on or off by manual operation of a toggle mounted in the housing of the electric power switch, as long as the commutator on the side of the housing is set in the "stand-by" position. If said commutator is set in the "simulation" position, the electric power switch is then operated automatically by the built-in electronic control timer, housed in said housing and protected from external influences, which might impair its correct operation.
Figure 1A:
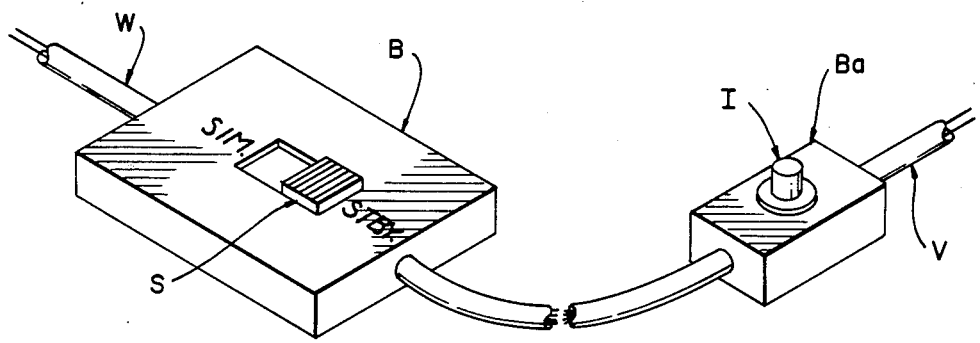
FIG. 1a is a perspective view of an electric power switch and its remote manual operated toggle or button, which is connected to the electric power switch by additional wirings incorporated into the special portion of the power cord between the electric power switch and the remote toggle or button. The normal power cord is connected at one end at the appropriate side of the electric power switch and at the other end at the appropriate side of the remote toggle's or button's housing.
Figure 1B:
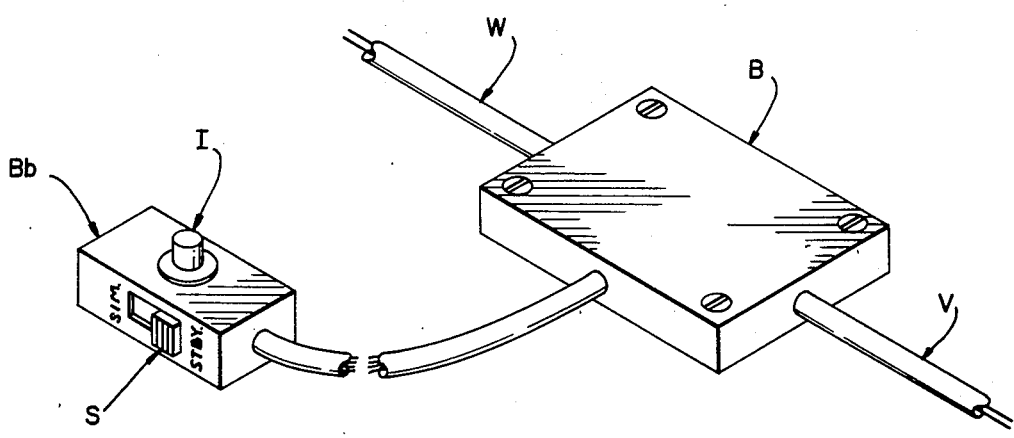
FIG. 1b is a perspective view of an electric power switch and its remote manual operated toggle or button together with the remote stand-by/simulation commutator, both of which are connected to the electric power switch by suitable wirings in a special cord, whereas the ends of the electric power cord are directly connected at the appropriate sides of the electric power switch.

Referring now to FIG. 1, FIG. 1a and FIG. 1b, there is shown an electric power switch housed in a housing B, connected between the ends of power carrying cord V (plug side) and W (appliance input). The manually operated toggle or button I is housed in B, as depicted on FIG. 1 or in a remote auxiliary housing Ba connected to the power cord as depicted in FIG. 1a, or finally in an auxiliary remote housing Bb together with the stand-by/simulation commutator S, as depicted in FIG. 1b.

The stand-by/simulation commutator S is housed in B, as depicted in FIG. 1 and FIG. 1a, in such a way that it is accessible to manual operation from the user, when the housing B is mounted or incorporated in an appliance or apparatus, which is controlled by the electric power switch. In the case that this shall not be possible for practical reasons, the commutator S is then incorporated into the auxiliary remote housing Bb, as earlier mentioned and as depicted in FIG. 1b.

The commutator S has in the present example two distinct positions "stand-by" and "simulation", which are visually indicated by appropriates signs on the housings B or Bb, so that the user can check in which mode of operation the electric power switch is set. If more modes of operations are available, like the e.g. "remote control" mode, then the commutator S shall have additional stable and visually indicated positions, so as to indicate to the user, in which mode the electric power switch is operating.

In each of the examples of FIGS. 1, 1a and 1b, use of the electric power switch according to the present invention is straightforward: as long as the commutator S is in the "stand-by" position, the turning on and off of the appliance or apparatus controlled by it is performed by the user by manual operation of toggle or button I, as it is widely used in common electric power switches. When the user wants to operate the electric power switch during his absence, he just has to set the commutator S in the "simulation" position before leaving. From that moment on, the built-in electronic timer will take over the operation of the electric power switch according to the schedule of on/off switching sequences which has been stored in the immediately preceding cycle during the "stand-by" mode of operation. To get back to the "stand-by" mode of operation, the user has only to set the commutator S in the "stand-by" position again. Similar considerations apply, if the commutator S has more than two stable positions, since they are visually apparent and indicated to the user.

DESCRIPTION OF THE MAIN ELEMENTS OF THE ELECTRIC POWER SWITCH

Figure 2:
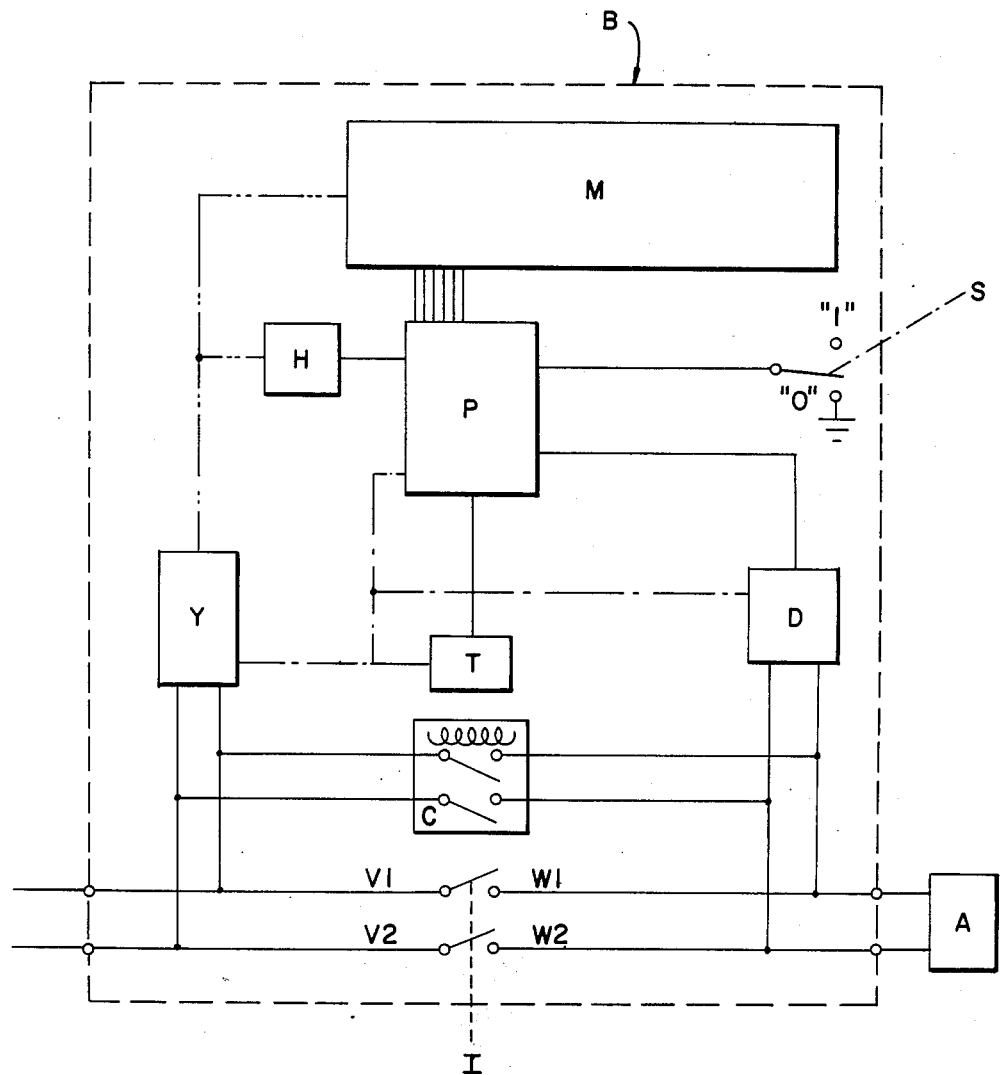
FIG. 2 is a box diagram of the basic control elements of the electronic control timer and of the power switching means according to an embodiment of the present invention, where said power switching means have an air gap when in the "off" state and where both the toggle or button and the stand-by/simulation commutator are mounted in the same housing as the electric power switch.

Coming now to FIG. 2, there is shown two AC power lines V1 and V2 on the input side of the electric power switch housed in B, which are connected to the DC low voltage power supply Y, to the terminals of an electromechanical relay C and of a contactor mechanically operated by the toggle or button I. At the output side there are two AC power lines W1 and W2, connected at the corresponding terminals of the relay C and of the contactor mechanically operated by I as well as to connected to a voltage sensing detector D, which transforms the AC voltage into a suitable DC low voltage signal compatible with the input levels of the microprocessor P. These power lines W1 and W2 bring the power to the appliance or apparatus A. If, A needs a 3-phase power feed, the electromechanical relay C and the contactor mechanically operated by I are changed accordingly, whereas the low voltage power supply Y and the detector D can be fed by only two phases, or by a phase and the common.

The low voltage DC power supply Y has a rechargeable battery or a lithium battery or other suitable DC electric power storage means, which allow it to feed appropriate electric DC power to the clock H and the memory M of the electronic control timer, in case that a power failure on the lines V1 and V2 occurs. The microprocessor P, which manages all the functions of the electronic control timer, is connected to the detector D and to an output interface unit T, which commands the relay C. The three elements P,D and T are fed by low voltage DC power from a separate line of Y, which is not protected against mains power failure on the lines V1 and V2.

The microprocessor P is further connected to the clock H, from where it gets the appropriate timing signals, and to the memory M, in which are stored the sequences of on/off power switchings detected and stored during one cycle in the "stand-by" mode and continously refreshed as long as the electric power switch stays in the "stand-by" mode, said sequences being entered into the memory M by the microprocessor P according to corresponding input signals coming from detector D concerning presence or absence of AC voltage on the lines W1 and W2. The contact of commutator S is also connected to P in such a way that e.g. when said contact is on the "0" digital voltage level, the microprocessor P is forced to operate in the "stand-by" mode, whereas if said contact is on the "1" digital voltage level, P is forced to operate in the "simulation" mode.

The operating software which is necessary to operate the microprocessor P according to the present invention is stored in ROM or EPROM memories, which are incorporated in the same chip as the microprocessor P. When P is forced to operate in the "simulation" mode by having the contact of commutator S on the "1" digital voltage level, the microprocessor P reads the content of memory M, which in this case is no longer refreshed by the output of detector D, and transforms said content into timed commands, which over the output of the output interface unit T are causing relay C to turn on and off the electric power on lines W1 and W2 according to the schedule stored in M and within the timing precision of the minimum sampling time of the microprocessor P. This action goes on continously, in the sense that when the content of one cycle has been read, the microprocessor P starts reading at the beginning of the cycle again and indefinitely, unless the commutator S is brought back by the user in the "stand-by" position.

If a short power failure occurs on lines V1 and V2, the clock H and the content of memory M are thereby not concerned, being fed automatically by the rechargeable batteries of Y, so that when the mains power comes back, P picks up the content of M at the correct location as instructed by the timing signals of H and continues playing back the on/off switching sequences on C, as if there was no mains failure at all.

As an illustration of this first example, an electric power switch has been built, having as microprocessor P a 8-bit integrated circuit of the 8751 Intel type, as memory M a 16 kbits integrated circuit of the HM6116LP Hitachi type and as a timing unit for the clock H incorporated into the 8751 type processor a 12 Mhz quartz resonator. The cycle time was one week and the processor 8751 did sample every minute the output of detector D, transferring it into the memory HM6116LP during the "stand-by" mode. In this particular case only $60 \times 24 \times 7 = 10,080$ bits of the memory HM6116LP were needed in order to fully cover storage of a whole recoding cycle of 168 hours.

Figure 3:
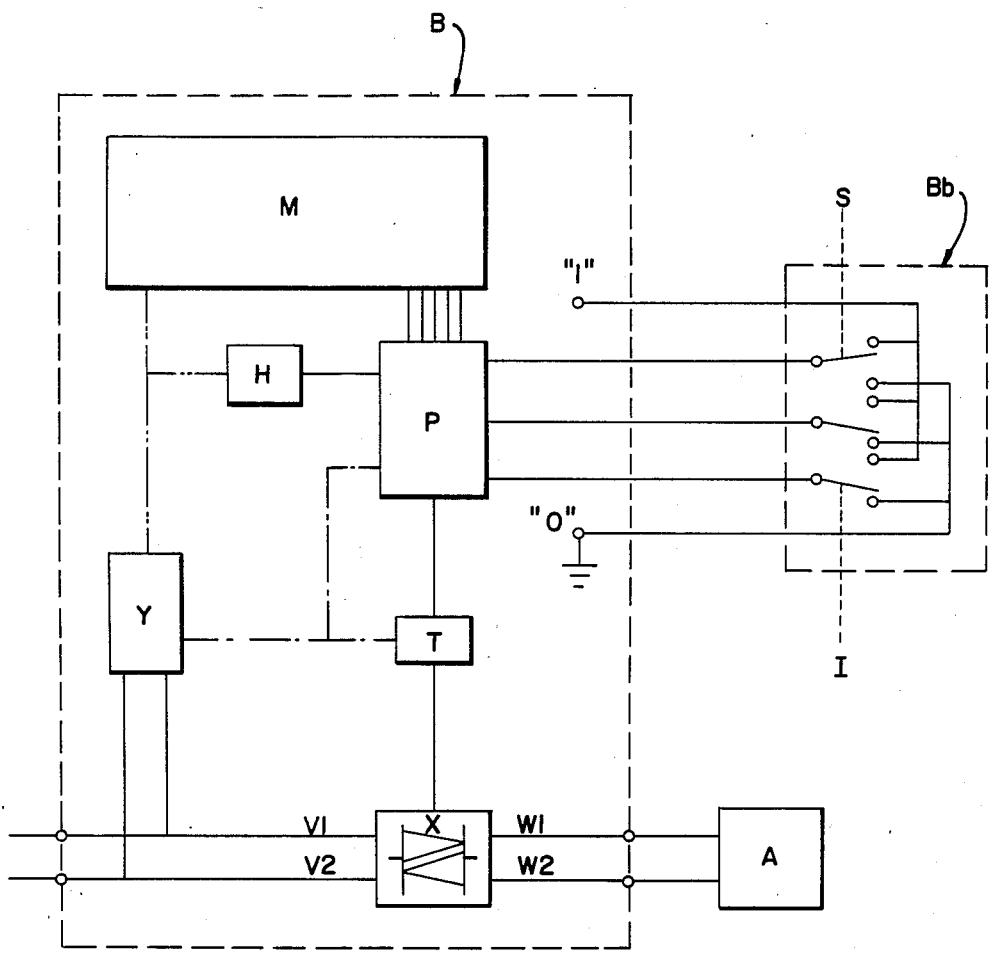

It is now apparent to persons skilled in the field of electronic controls using microprocessors, that further features of the present invention and following can be implemented by adding suitable inputs to the microprocessor P, by connecting it with other suitable electronic units, by introducing more complex instructions in the operating software which runs the microprocessor P or by a combination of all these said means. Referring to FIG. 3, whereby the contactor mechanically operated by the toggle or button I is spacially separated from housing B, it is apparent to persons skilled in electricity that the wirings connecting the auxiliary housing Ba or Bb to housing B of FIG. 1a or FIG. 1b includes the lines V1,V2,W1,W2 in both cases, with the addition of three wirings (contact input to P,"0" and "1" digital voltage levels) to the terminals of commutator S in the FIG. 1b.

DESCRIPTION OF A SECOND EXEMPLARY FORM OF INVENTION

From the user's standpoint, all what was said in the foregoing description of first exemplary form of the invention still applies. Referring now to the FIG. 3, there is shown a housing B, containing the earlier described building elements Y,H,M,P and T, with the exception of relay C and of detector D, no longer needed, and with the addition of suitable ignition controlled silicon rectifiers or power transistors X, acting as power switching means. In a separate auxiliary housing Bb there are contacts connecting suitable inputs of P to the "0" or "1" digital voltage level, the first of said contacts being activated by the toggle I, the other ones being activated by commutator S in such a way, that the three commands "stand-by", "fail-safe stand-by" and "simulation" are univocally transmitted to P when commutator S is in the corresponding position.

As long as S is in the "stand-by" position, changes of status level of the contact operated by the toggle I are stored by P into the memory M and at the same time they enable or disable through the output interface unit T the ignition of X, thus effectively turning on or off the power on lines W1 and W2, as requested by manual operation of toggle I. If the commutator S is positioned on "simulation", the input coming from the contact operated by I is disabled and P starts reading the content of M and accordingly enabling or disabling thru T the ignition of X, thus replaying the sequences of on/off power switchings commanded by operation of I during the cycle immediately preceding the transition from "stand-by" to the "simulation" mode.

If the commutator S is positioned as to force P into the "fail-safe stand-by" mode, as long as the changes of status of the contact operated by I follow each other within a predermined lapse of time, they are stored into M and at the same time they enable or disable through T the ignition of X, as it always is in the "stand-by" mode. Once the toggle I is not operated for a lapse of time longer than said predetermined lapse (e.g. one day), the microprocessor P automatically goes over into the "simulation" mode, but the input of the contact operated by I is not disabled, allowing the microprocessor P to revert to the "stand-by" mode as soon as I is operated again.

As an illustration of this second exemplary form of the invention, an electric power switch was built having as P an integrated circuit of the 40C49 type, as memory M an integrated circuit of the HM6116LP type backed by auxiliary integrated circuits 74C373 and 27C16 and as power switching means X a triac of the 2N6073A type. Said illustration was fitted into a housing B with dimensions less than 10×5×2 cm., including rechargeable batteries of the NiCd type for a nominal voltage of 5 volts DC. It is now apparent to persons skilled in the field of electronic controls using microprocessors, that further features of the present invention and following can be implemented by adding suitable inputs to P, by connecting to P suitable signal processing units, such as high frequency signal receiver or emitter and the like, by introducing more complex instructions sets in the operating software of P, such as routines for periodically checking the content of 24-hours segments of M and for replacing empty segments with other available segments having more than predetermined number of on/off sequences, or such as routines for commanding coded on/off sequences of power switchings on the lines W1,W2 by acting on ignition of X, if specific information about the status of the electric power switch or of its elements and detected by suitable means affecting P, has to be indicated to the user.

Furthermore a solar cell fed electronic unit can be connected to Y in order to keep its rechargeable batteries at operating voltage, taking into account that said batteries have to continously feed DC power to the clock H and to the memory M also during nighttime, in case of prolonged disconnection of the power on lines V1,V2. By adding a voltage sensing electronic unit into Y, which sends appropriate alarm signals to P if the batteries voltage is lower than a predetermined limit, a routine of the operating software of P is activated, whereby P commands coded sequences of on/off switchings to X, thus signalling to the user that batteries have to be replaced or checked.

It is also apparent to skilled persons, that if power switching means are required, which in the "off" state have an open air gap, the solid state switches in X are replaced by an electromechanical relay, which is controlled by a suitable output interface unit in T.

The practical applications of the electric power switch according to the present invention are of different nature and can be found in fields as diverse as medical patient care, biology, intelligence and military, feeding of animals, security of goods and persons and the like, where operation of electrical apparatus should continue if the user consciously or unconsciously is prevented to directly and manually operate said toggle or button.

A preferred application of the electric power switch according to the present invention is the control of illumination sources in houses and offices, like electrical lamps or motor-driven window-shutters and the like.

By now it should be apparent that the present invention allows to build extremly user friendly and ever-ready electric power switches, which do not require any special programming of on/off schedule by the user other that the regular use of the electric power switch in the "stand-by" mode for at least a short period of its chosen cycle time, which if necessary can be extended to encompass the change of seasons over a whole year (52 weeks), if a memory M of sufficient capacity (e.g. 64 kbits or 256 kbits RAM's) is used.

It should be understood that numerous modifications may be made with reference to the exemplary forms of the invention as described in this patent application, without deviating from the broader aspects of the present invention.

I claim:

1. An electric power switch comprising:
    power input terminals which can be connected to an external voltage supply;
    power output terminals;
    a power switch having a control terminal and connected between said input and output terminals;
    a source of timing signals;
    memory means;
    a manually operable switch for producing a first logic signal which can be either at a first or at a second level;
    means for producing a second logic signal which can be either at a first or at a second level; and
    a control unit coupled with said memory means and connected to the control terminal of said power switch and to receive said timing signals, said control unit including:
    means responsive to the first level of said second logic signal for continuously storing in said memory means, over an extended period of time each occurrence in time at which the first logic signal takes its first and second levels, respectively;
    means responsive to the first level of said second logic signal for applying to the control terminal of said power switch a control signal which causes the power switch to electrically connect said input and output terminals when the first logic signal takes its first level and to electrically disconnect said input and output terminals when the first logic signal takes its second level; and
    means responsive to the second level of said second logic signal for applying cyclically to the control terminal of said power switch at said each occurrence in time stored in the memory means, control signals which cause the power switch to electrically connect said input and output terminals at said each occurrence in time corresponding to the first logic signal taking its first level and to electrically disconnect said input and output terminals at said each occurrence in time corresponding to the first logic signal taking its second level.

2. An electric power switch comprising:
    power input terminals which can be connected to an external voltage power supply;
    power output terminals;
    a manually operable switch connected between said input and output terminals;
    a power switch which has a control terminal and is connected between said input and output terminals;
    a voltage sensing detector connected to said output terminals and providing an output signal which is at a first level in the presence of a voltage at said output terminals and at a second level in the absence of said voltage at said output terminals;
    a source of timing signals;
    memory means;
    means for producing a logic signal which can be either at a first or at a second level; and a control unit coupled with said memory means and connected to the control terminal of said power switch, to an output of said detector, and to receive said timing signals and said logic signal, said control unit for supplying a control signal including:

means responsive to the first level of said logic signal for continuously storing in said memory means, over a predetermined period of time, each occurrence in time at which the output signal of said detector takes its first and second levels, respectively; and means responsive to the second level of said logic signal for applying cyclically to the control terminal of said power switch, at said each occurrence in time stored in the memory means, said control signal which cause the power switch to electrically connect said input and output terminals at said each occurrence in time corresponding to the output signal of said detector, taking its first level and to electrically disconnect said input and output terminals at said each occurrence in time corresponding to the output signal of said detector taking its second level.

* * * * *